R. J. J. MUELLER.
CHEESE HOOP FOLLOWER.
APPLICATION FILED JAN. 24, 1916.
1,248,696.
Patented Dec. 4, 1917.
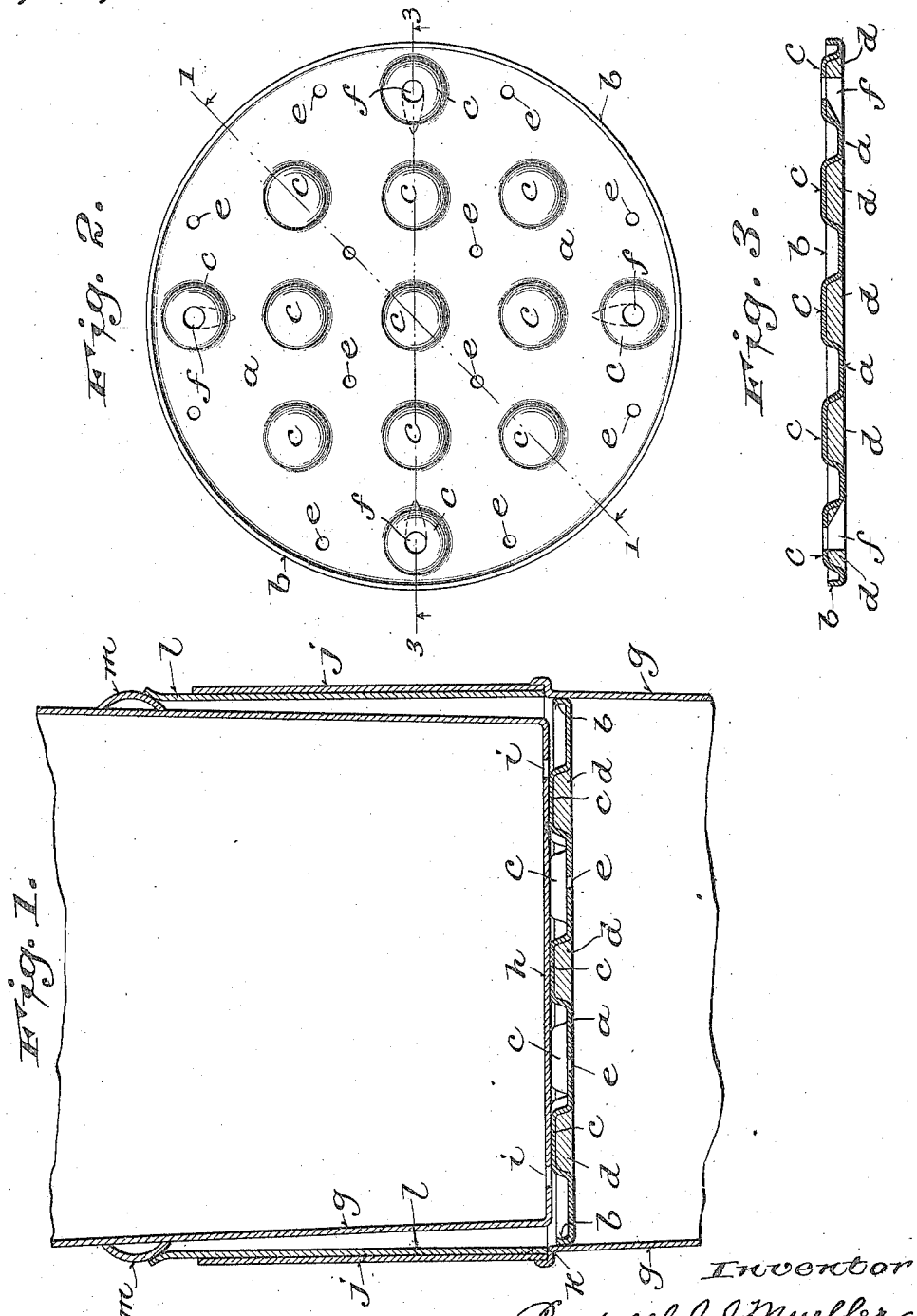

UNITED STATES PATENT OFFICE.

RUDOLPH J. J. MUELLER, OF SHEBOYGAN, WISCONSIN, ASSIGNOR TO UNIVERSAL OXYGEN COMPANY, OF SHEBOYGAN, WISCONSIN, A CORPORATION OF WISCONSIN.

CHEESE-HOOP FOLLOWER.

1,248,696.      Specification of Letters Patent.      Patented Dec. 4, 1917.

Application filed January 24, 1916. Serial No. 73,792.

*To all whom it may concern:*

Be it known that I, RUDOLPH J. J. MUELLER, a citizen of the United States, residing at Sheboygan, in the county of Sheboygan and State of Wisconsin, have invented certain new and useful Improvements in Cheese-Hoop Followers, of which the following is a specification, reference being had to the accompanying drawing, forming a part thereof.

The main objects of this invention are to produce a follower which can be easily cleansed and kept clean, which will afford free and ample drainage for the whey, which can be easily and economically made and which will not mutilate or disfigure the cheese, and generally to improve the construction and operation of devices of this class.

It consists in the peculiar construction, arrangement and combination of parts as hereinafter particularly described and pointed out in the claims.

In the accompanying drawings like characters designate the same parts in the several figures.

Figure 1 is an axial section on the line 1—1, Fig. 2, of a follower embodying the invention in connection with portions of two cheese hoops illustrating the manner of assembling them in a press; Fig. 2 is a plan view of the upper or outer side of the follower, and Fig. 3 is an axial section of the follower on the line 3—3, Fig. 2.

The follower, which is made of circular or other shape to conform with the shape of the hoops with which it is to be used, consists of a piece of sheet steel or other metal stamped or pressed with an up or out-turned marginal stiffening and bearing flange $b$ and with a number of isolated upwardly or outwardly projecting and preferably round or circular bosses $c$ which are of somewhat greater depth than the flange $b$ and are separated from one another so as to bear at intervals against the bottom of an adjoining hoop and to provide a free drainage space, as shown in Fig. 1, for the whey expressed from the cheese or curd.

The flange $b$ forms an extended peripheral bearing which tends to prevent the follower from tipping in the hoop and the curd or cheese from being squeezed out between the follower and hoop.

The cavities formed by the bosses in the under or inner side of the follower are filled, as shown at $d$ in Figs. 1 and 3, with solder or some metal or alloy of metals fusible at a lower temperature than the sheet metal $a$ so as to present a plain smooth face to the cheese and thus avoid disfiguring the cheese.

Between the bosses $c$ the follower is formed at intervals with drainage holes $e$.

Some of the bosses, preferably those nearest the margin of the follower, are formed as shown in Figs. 2 and 3 with undercut holes $f$ to receive hooks for withdrawing the follower from a hoop after a cheese has been pressed therein, the points of the hooks engaging with the undercut portions of the holes without gouging into and mutilating the cheese.

The follower may be tinned or plated with non-corrosive metal to prevent it from rusting and injuring or affecting the cheese, and to enable it to be easily kept in a clean and sanitary condition.

In practice the follower is assembled with cheese hoops, as shown in Fig. 1, portions of two hoops and a bandage sleeve or ring being shown, each hoop comprising a tapering lower section or portion $g$ having a bottom $h$ formed at intervals with drainage holes $i$, and an upper cylindrical section or portion $j$ forming at its junction with the lower portion or section $g$ an internal shoulder $k$. A split contractile spring bandage sleeve or ring $l$ is removably fitted in the upper cylindrical portion of each hoop. This sleeve or ring, corresponding in thickness with the width of the shoulder $k$ against which it is adapted to be seated at its lower or inner edge, is of somewhat greater depth than the upper cylindrical portion $j$ of the hoop so as to project therefrom when inserted therein, as shown, and is preferably flared outwardly at its upper and outer end to facilitate entering the follower therein. The tapering lower portion $g$ of each hoop is formed with an external ring or shoulder $m$ which, by engagement with the upper or outer end of the bandage sleeve $l$, limits the extent to which the lower tapering portion of one hoop can be inserted in the upper cylindrical portion $j$ of another hoop as shown.

In operation, bandage cloths are placed in the hoops and the sleeves $l$ are inserted therein to bind and hold the cloths in place.

The hoops are then filled with curd approximately to the tops of the bandage sleeves *l*, followers are placed over the curd and the filled hoops are finally assembled in a press and pressure applied to the series of hoops in such a way as to force the smaller end of each hoop with the follower against which it bears into the larger end of the adjoining hoop. The whey expressed from the curd passing through the drainage holes *e* in the follower from one hoop and through the drainage holes *i* in the bottom of the adjoining hoop into the space between the follower and the bottom of the hoop bearing against it, escapes freely therefrom through the annular space between the tapering portion *g* of one hoop and the surrounding bandage sleeve *l* of the adjoining hoop.

Before the pressing operation is completed, and after the greater part of the whey has been expressed from the curd according to the usual practice, the hoops are separated from one another, the followers and the bandage sleeves *l* are withdrawn therefrom, and the bandage cloths are folded inwardly over the exposed ends of the cheeses around which they are wrapped. The sleeves *l* are then replaced in the hoops, the followers are inserted therein and the hoops being assembled as before in the press, the cheeses are subjected to the final pressing operation by which the rings or shoulders *m* are forced into engagement with the upper or outer ends of the sleeves *l* and the followers are forced out of the inner or lower ends of said sleeves into the upper or outer ends of the tapering lower portions *g* of the hoops, as seen in Fig. 1.

To remove the followers after the preliminary and final pressing operations, hooks are inserted in the undercut holes *f* of the followers and they are easily withdrawn without mutilating or disfiguring the cheese.

The followers, constructed as herein shown and described, have no joints or crevices in which dirt can lodge, are strong and rigid, are comparatively light and occupy but little space, are easily cleansed and kept clean, and are of simple and economical construction.

Various modifications in minor details of construction may be made without departure from the principle and scope of the invention as defined in the following claims.

I claim:

1. A cheese hoop follower formed on one side with a marginal stiffening and bearing flange and isolated spacing bosses of greater depth than the flange and having a smooth plane face on the other side and drainage holes between the bosses.

2. A cheese hoop follower formed on one side with isolated spacing bosses and having a smooth plane face on the other side, drainage holes between the bosses, and an undercut hook hole through one of the bosses.

3. A cheese hoop follower formed of sheet metal with a marginal stiffening and bearing flange and isolated bosses of greater depth than the flange, on one side, and with drainage holes between the bosses, the cavities formed by the bosses in the other side of the follower being filled with solid material flush with that side of the follower which has a smooth plane face.

4. A cheese hoop follower formed of sheet metal with a marginal stiffening and bearing flange and isolated bosses of greater depth than the flange on one side, and having drainage holes between the bosses, the cavities formed by the bosses in the opposite side of the sheet metal being filled with solid material flush with the intermediate portions of the sheet metal on that side of the follower which has a smooth plane face, some of the bosses being formed with undercut hook holes.

5. A cheese hoop follower formed on one side with isolated spacing bosses and having drainage holes between the bosses, one of the bosses being formed with an opening for insertion of a hook.

6. A cheese hoop follower formed of sheet metal with a marginal stiffening flange, isolated spacing bosses on one side, drainage holes between the bosses, and with an opening through one of the bosses for insertion of a hook.

In witness whereof I hereto affix my signature in presence of two witnesses.

RUDOLPH J. J. MUELLER.

Witnesses:
 FRANCES WILLIAMS,
 IDA B. ZUFELT.